(12) United States Patent
Doherty et al.

(10) Patent No.: US 8,776,321 B2
(45) Date of Patent: Jul. 15, 2014

(54) ERGONOMIC, SHOCK-ABSORBING HAND GRIP

(71) Applicant: SideStix Ventures Inc., Roberts Creek (CA)

(72) Inventors: Sarah Doherty, Roberts Creek (CA); Kerith Perreur-Lloyd, Roberts Creek (CA); Barbara Poerschke, Ganges (CA)

(73) Assignee: SideStix Ventures Inc., Roberts Creek (CA)

( * ) Notice: Subject to any disclaimer, the term of this patent is extended or adjusted under 35 U.S.C. 154(b) by 0 days.

(21) Appl. No.: 13/652,211

(22) Filed: Oct. 15, 2012

(65) Prior Publication Data
US 2013/0152343 A1    Jun. 20, 2013

Related U.S. Application Data

(60) Provisional application No. 61/548,829, filed on Oct. 19, 2011.

(51) Int. Cl.
*B25G 1/10* (2006.01)

(52) U.S. Cl.
USPC .................. 16/430; 16/436; 16/422; 16/431

(58) Field of Classification Search
CPC .............. A63B 53/14; A63B 59/0029; A63B 59/0014; A01K 87/08; A46B 5/01; B25G 1/00; B25G 1/002; B25G 1/005; B25G 1/01; B25G 1/02; B25G 1/10; B25G 1/12; B25G 1/125; B62K 21/26; B62K 21/125; B62K 21/14; B62K 21/12; B62K 23/04; B63B 59/0092; B63B 59/0014; Y10S 16/12; Y10S 16/24; Y10S 16/25

USPC ............ 16/431, 430, 422, DIG. 12, DIG. 19; 81/177.1, 177.6, 489, 900; 173/210–212, 162.1, 162.2, 170; 273/317.2, 317.4; 473/538, 549, 568, 473/300–303; 74/551.9, 558, 558.5, 543; 294/132, 137, 102.1, 102.2, 15, 171; 15/144.1, 144.2, 144.3, 143.1, 145
See application file for complete search history.

(56) References Cited

U.S. PATENT DOCUMENTS

| | | | | |
|---|---|---|---|---|
| 3,077,349 A * | 2/1963 | Leonard | ......................... | 473/203 |
| D248,616 S * | 7/1978 | Johnson | ......................... | D8/303 |
| 4,599,920 A * | 7/1986 | Schmid | ......................... | 81/489 |
| 4,785,495 A * | 11/1988 | Dellis | ......................... | 16/421 |
| 4,972,733 A * | 11/1990 | Olmr et al. | ................... | 74/551.9 |
| 5,740,586 A * | 4/1998 | Gomas | ......................... | 16/436 |
| 6,305,051 B1 * | 10/2001 | Cho | ................................ | 16/430 |
| 6,370,986 B1 * | 4/2002 | Scott | ................................ | 81/22 |

(Continued)

FOREIGN PATENT DOCUMENTS

| | | | | |
|---|---|---|---|---|
| GB | | 2493147 A | * | 1/2013 |
| WO | WO/2010/069070 | | | 6/2010 |

*Primary Examiner* — Chuck Mah
(74) *Attorney, Agent, or Firm* — Cameron IP

(57) ABSTRACT

A hand grip for use on a handle of an assistive mobility device or a bicycle has a body and an integral fin. Both are designed to damp vibration and reduce the force experienced by a user's hand. This is accomplished by using different thicknesses of an elastomeric material in the structural layer of the hand grip and by designing the fin to flex. The grip is covered with a soft elastomeric outer layer that provides additional cushioning.

20 Claims, 8 Drawing Sheets

(56) References Cited

U.S. PATENT DOCUMENTS

| | | | |
|---|---|---|---|
| 6,832,413 B1* | 12/2004 | Applewhite et al. | 16/430 |
| 6,959,469 B2 | 11/2005 | Blauer | |
| 6,968,599 B2* | 11/2005 | Blauer et al. | 16/431 |
| 7,028,581 B2* | 4/2006 | Williams et al. | 74/551.9 |
| 7,175,538 B2* | 2/2007 | Miller | 473/300 |
| 7,401,384 B2* | 7/2008 | Chen | 16/431 |
| 7,441,310 B2* | 10/2008 | Chen | 16/430 |
| D618,534 S* | 6/2010 | Minkow et al. | D8/303 |
| 7,877,843 B2* | 2/2011 | Holland-Letz | 16/436 |
| 2004/0048701 A1 | 3/2004 | Falone | |
| 2005/0039565 A1* | 2/2005 | Minkow et al. | 74/551.9 |
| 2005/0155186 A1* | 7/2005 | McGuyer et al. | 16/430 |
| 2006/0124158 A1* | 6/2006 | Lin et al. | 135/24 |
| 2006/0169308 A1* | 8/2006 | Yen et al. | 135/25.4 |
| 2006/0174450 A1* | 8/2006 | Chen | 16/436 |
| 2007/0119282 A1* | 5/2007 | Lee | 81/489 |
| 2007/0143966 A1* | 6/2007 | Fischer | 16/422 |
| 2008/0072702 A1* | 3/2008 | Arnold | 74/551.9 |
| 2009/0072455 A1 | 3/2009 | McPherson | |
| 2009/0114257 A1 | 5/2009 | Sutton | |
| 2009/0223320 A1* | 9/2009 | Chen et al. | 74/551.9 |
| 2009/0271951 A1 | 11/2009 | Hao | |
| 2011/0219909 A1 | 9/2011 | Galstad | |

* cited by examiner

ERGONOMIC, SHOCK-ABSORBING HAND GRIP

RELATED APPLICATIONS

This application claims priority to U.S. provisional patent application Ser. No. 61/548,829, filed 19 Oct. 2011, the contents of which are incorporated herein by reference.

FIELD

The present technology relates to an ergonomic hand grip that provides shock absorption and reduces fatigue. More specifically, the present technology is a hand grip of varying thickness to permit support while also absorbing shock and vibration.

BACKGROUND

Many hand held devices have hand grips that provide some shock absorption. Similarly, sporting equipment, such as golf clubs and bicycles, has grips that reduce the force of impact and damp vibration.

For example, US Publication No. 20110219909 discloses a handlebar with dampers underneath the hand grips. The dampers are preferably constructed of an elastomeric or rubber-type material whereas the body of the handlebar assembly is formed of a more rigid material, such as a metal, like steel or aluminum based materials, and/or carbon fiber material. It is disclosed that the dampers are formed of a more pliable and resilient material having durometer values between about A25, a durometer value comparable to a rubber band, and about A55, a durometer value comparable to a door seal. Also disclosed are supplemental or optional grip assemblies that are configured to cooperate with handlebar assembly and dampers. The core of the grip assemblies includes a window or opening that extends in a longitudinal direction along a substantial portion of core. When the core is engaged with body of handlebar assembly, the opening overlies and exposes all or a substantial portion of the hand side of the dampers underneath. This allows the vibration or oscillation damping performance of handlebar assembly to be augmented by the vibration or oscillation damping performance attributable to grip assembly. The grip has an ear that extends in a radially outward direction from core near the outboard end of the core. This is for indexing the grip with respect to the core.

In US Publication No. 20090072455 a damper is disclosed for various applications, including sporting equipment. The damping portion comprises a first tube, a second tube and a layer of resilient material configured so that the first tube is disposed about the second tube, and the layer of resilient material is positioned between the first and second tubes.

US Publication No. 20040048701 discloses a vibration absorbing grip including a grip body formed by a multi-layer material. The material preferably includes a first elastomeric layer of vibration absorbing material which is substantially free of voids therein. A second elastomeric layer which includes an aramid material therein and is disposed on the first elastomeric layer. The aramid material distributes vibration to facilitate vibration damping. A third elastomeric layer is disposed on the second elastomeric layer and is adapted to be gripped by a user.

U.S. Pat. No. 6,959,469 discloses a pliable handle for a hand held device. As in the previous mentioned patents, there is provided a core member and an outer sheath, with gel being disposed between the core member and the outer sheath. The pliable handle is designed to deform and conform to the shape of the user's hand. The applied force causes movement of the gel, the pliable handle having a "memory effect" that causes the handle to temporarily deform for a period of time to the deformed shape before the handle returns to its original shape.

Some grips are designed to provide different amounts of damping in different parts of the hand grip, by using materials of differing durometer. For example, US Publication No. 20090271951 discloses a hand grip for hand tools and the like contains a plurality of elastomeric compositions to protect the users hand during use. As proposed a plurality of gel inserts are provided with varying degrees of hardness and density to provide an improved ergonomic design while insuring the integrity of the handle. Three layers are provided with the innermost layer being the hardest with a hardness of approximately 95 on the A Durometer scale, the middle layer having an intermediate hardness of approximately 55 on the A Durometer scale and the outermost layer being the softest with a hardness of approximately of 20 on the A Durometer scale.

The shape of the hand grip can also play a role in decreasing fatigue. For example, US Publication No. 20050039565 discloses an ergonomic hand grip. The first component is an outward protrusion of the rear portion of the grip, that is positioned towards the portion of the palm that lies under the fourth and fifth (ring and pinkie) fingers. This disperses pressure over Guyon's Canal (Ulnar Canal). The second component is an outward protrusion of the front portion of the grip, which may be positioned under the index, middle, ring and pinkie fingers. The protrusions of the front and rear portions increase the diameter of the grip itself, and improve the leverage of the handgrip. An inward curve of the grip under the thumb area may optionally be provided.

US Publication No. 20090114257 discloses the use of a damping compound that is resilient and is formed in part over the handle of a walking aid. The handle is ergonomically shaped.

As disclosed in WO/2010/069070, an ergonomic hand grip provides an ergonomic shaped handle having elastomeric inserts of various densities (durometers) on the grip surface area that complement the hand during usage of an assistive mobility device, such as a crutch or walking stick.

SUMMARY

A simplified hand grip that is ergonomically shaped and shock absorbing is provided. The simplified design allows for ease of manufacturing by reducing both the number of steps required and the range of materials used. At the same time, the hand grip provides superior support, vibration damping and impact absorption, thereby reducing fatigue for the user. Both ulna nerve irritation and wrist compression are reduced. The hand grip comprises an optional inner core, a structural layer made of a single elastomeric material, formed into a body and a fin and an outer covering made of a single material. The structural layer is harder than the outer layer. The fin provides support to the thenar eminence during the heel strike of a user's hand, while at the same time, also cushions the heel strike by flexing in response to the pressure exerted. The fin extends laterally and longitudinally from the body at the proximal and central regions and decreases in thickness distally. A concave region between the fin tip and the body accept a user's thumb. The body has a narrow proximal region, a narrow distal region and a thicker central region. The body has a generally cylindrical central bore for locating the grip on a tube, such as a bicycle handlebar or a handle of an assistive mobility device. The body has a distal end and a proximal end. The distal end has a locking member for locking the hand grip over the tube and the proximal end is sized to accept an end cap.

It is preferred that the fin has a lateral offset relative to a vertical axis of the hand grip and that offset be about 15 to about 30 degrees.

It is advantageous for the core to have a durometer rating of at least about 85 A, the structural layer to have a durometer rating of about 30 A to about 50 A and the outer layer to have a durometer rating of about 20 A to about 35 A.

Cushioning by the fin is promoted by having the flexibility of the fin increase toward the fin tip.

It is preferred that the fin has a longitudinal depression and is integral with the body as this allows the thenar eminence to fit comfortably on the fin and the hand to rest comfortably on the grip.

In order to allow for adjustments to be made, the hand grip preferably has a clamp in the vicinity of the proximal end, for clamping the hand grip to the handle.

It is preferred, for ease of putting the grips on the handle and aligning the grips, that the core has slots and a retainer aperture in the vicinity of the proximal end.

In another embodiment, an assembly for use with an assistive mobility device is provided. The assembly comprises a handle and an ergonomic hand grip. The hand grip comprises a body, a fin, and a clamp. More specifically, the body comprises a proximal end, a distal end, and a core therebetween, the core defining a central bore along a longitudinal axis for accepting the handle, the core having slots and a retainer aperture in the vicinity of the proximal end. Both the body and fin comprise a structural layer of a single material of variable thickness, and an outer layer of a single material of essentially consistent thickness. The core has a durometer rating of at least about 85 A, the structural layer has a durometer rating of about 30 A to about 50 A and the outer layer has a durometer rating of about 20 A to about 35 A. The fin is shaped to flexibly support a user's thenar eminence, extends from the body laterally and longitudinally, terminates in a fin tip distally, has a lateral offset relative to a vertical axis of the hand grip of about 15 to about 30 degrees, has a lateral depression, increases in flexibility distally and is integral with the body. The clamp adjustably retains the hand grip to the handle.

In yet another embodiment, an ergonomic, force-absorbing hand grip for use on a bicycle handlebar is provided. The hand grip comprises:
a body, the body comprising:
a structural layer of variable thickness; an optional core; a central bore for accepting the handlebar; an outer layer of essentially consistent thickness, the structural layer being harder than the outer layer; an inboard end; an outboard end, and a centrally located protrusion;
a fin, the fin being integral with and extending laterally from the body, terminating in a distally disposed tip, terminating in a distally disposed tip, and having a fin return defining, with the body, a concave region, and comprising: the structural layer; and the outer layer, the structural layer of variable thickness and the outer layer of essentially consistent thickness; and
a clamp, the clamp for releasably retaining the hand grip on the handlebar and for allowing for adjustment of the grip;
a clamp, the clamp for releasably retaining the hand grip on the handlebar and sized to fit over the inboard zone of the core,
wherein differences in thickness in the structural layer provide differences in force-absorption in the hand grip.

For ease of construction, it is preferable that each of the core (if present), structural layer and the outer layer is composed of a single material. The material used for the core has a durometer rating of at least about 85 A, the material used for the structural layer has a durometer rating of about 30 A to about 50 A and the material used for the outer layer has a durometer rating of about 20 A to about 35 A.

It is preferable that the fin is shaped to flexibly support a user's thenar eminence and has a lateral offset relative to a vertical axis of the hand grip of about 15 to about 30 degrees.

To assist in locating a user's hand, the hand grip may have a flange in the vicinity of the inboard end.

For safety when traveling in traffic, the hand grip may have a light in the outboard end.

If the hand grip is to be used on a road bike, it is preferable that the body comprises an upper section and a lower section. In order to attach the upper section to the lower section, mating members may be disposed on a longitudinal margin thereof.

For ease of construction, it is preferable that the fin be integral with the lower section of the body.

For ease of assembly, it is preferred that the hand grip be provided with two clamps, the clamps being two piece clamps for fitting over the hand grip and handlebars.

FIGURES

DETAILED DESCRIPTION

Definitions

Distal refers to away from the body in relation to a crutch or assistive mobility device.

Proximal refers to toward the body in relation to a crutch or assistive mobility device.

Outboard in the context of a bicycle refers to the direction that is toward the end of the handlebar.

Inboard in the context of a bicycle refers to the direction that is toward the stem of the handlebar.

DESCRIPTION

Figure 1:
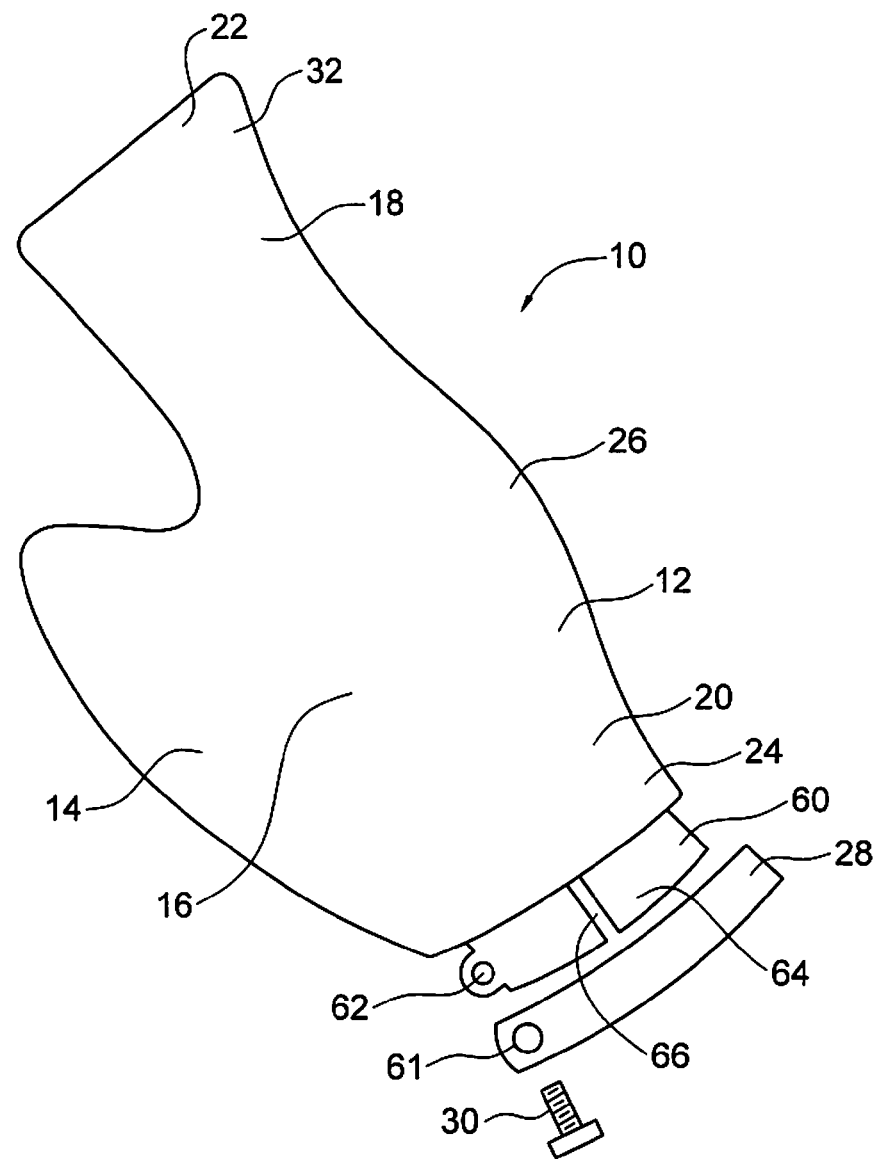
FIG. 1 is a perspective view of an embodiment of the present technology, with the proximal end exploded.

A hand grip, generally referred to as 10 is shown in FIG. 1. The hand grip has a body 12 and an integral fin 14. The body has a central region 16, a distal region 18, a proximal region 20, a distal end 22 and a proximal end 24. The fin 14 extends distally from the proximal 20 and central region 16. The central region 16 has a protuberance 26. A split ring or C-type clamp 28 is located at the proximal end 24 and encircles the innermost layer or core 60 of the hand grip 10. The clamp 28 has a fastener 30 that when tightened, compresses the clamp 28 and the core 60. The fastener 30 extends through a clamp aperture 61 and a vertically disposed retainer aperture 62 to assist in aligning the hand grip 10 and clamp 28. The distal end 22 terminates in a flange 32.

Figure 2:
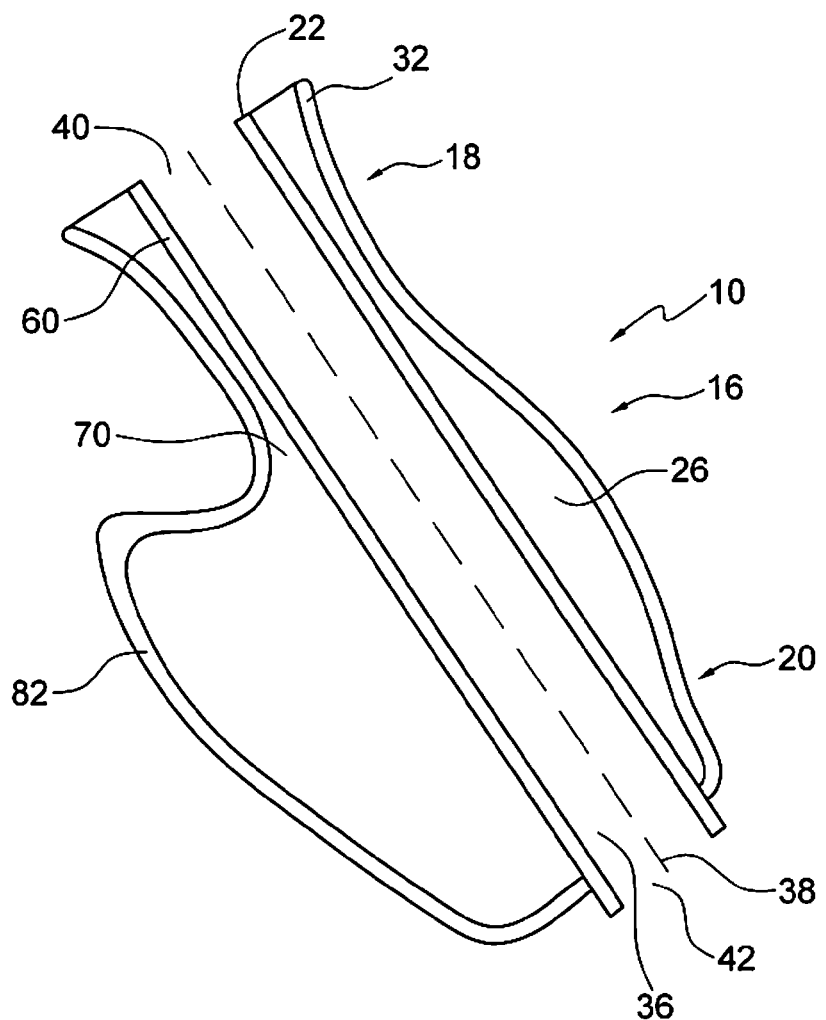
FIG. 2 is a longitudinal section view of the embodiment of FIG. 1.

As shown in FIG. 2, the distal and proximal regions, generally shown as 18 and 20, are thinner in cross sectional area than is the central region, generally referred to as 16, with a gradual increase in cross sectional area in the distal region 18 and the proximal region 20, leading to the protuberance 26. The cross sectional area also increases around the distal end 22 in the flange 32. A central bore 36 extends along a longitudinal axis 38 of the hand grip 10 between a distal aperture 40 and a proximal aperture 42. The dimensions of the body are as follows:
- the length is about 110 to about 150 mm long, preferably about 120 mm to about 140 mm, more preferably about 130 mm long;
- the width is about 25 to about 35 mm wide, preferably about 30 mm wide at the narrowest point, increasing to about 35 mm to about 45 mm wide, preferably about 38 mm wide, including at the flange 32 and the protuberance 26; and
- the diameter of the central bore 36 is about 20 to about 25 mm in diameter, preferably about 22 mm.

Also shown in FIG. 2, the innermost layer of the hand grip 10 is a hard plastic core 60, having a durometer rating of at least about 80, preferably about 85 and more preferably about 85 to about 90 on the A durometer scale. Alternatively, the core 60 is integral with the structural layer 70 and therefore has the same durometer rating as the structural layer 70. To be clear, either the structural layer 70 or the core 60 form the inner layer 60 and the inner layer 60 defines the central bore 36. The central bore 36 of the core 60 is sized to fit snugly over the tube 50. As shown in FIG. 1, the proximal zone 64 of the core 60 has at least one slot 66 extending into the core 60. The slot allows the circumference of the core 60 to be reduced under the pressure of the clamp 28, thereby retaining the hand grip 10 in place.

As shown in FIG. 2, the middle layer of the hand grip 10 is a structural layer 70. The structural layer 70 is composed of a single elastomeric thermoplastic, such as, but not limited to Ethylene Vinyl Acetate. The material can be foam or a soft plastic polymer or alternatively, a high-density polyethylene (HDPE), such as ThermoLyn™ RCH 500. It is formed into the body 12, the protuberance 26, the fin 14 and the flange 32.

The material used in the structural layer has a durometer rating of about 30 to about 55, preferably about 35 to about 50 and more preferably about 40 to about 45 on the A durometer scale. Rather than using a number of materials of differing durometer ratings to provide differences in the degree of support and damping, the present technology uses differences in thickness to provide differences in the degree of support and damping. This simplifies construction of the hand grip and provides superior support, vibration damping and impact absorption, thereby reducing fatigue for the user.

With regard to the body 12, the middle layer 70 is about 0.5 mm to about 2 mm thick, preferably about 1 to about 1.5 mm thick on the distal 18 and proximal regions 20 of body 12, increasing gradually to about 1 mm to about 2.5 mm, preferably about 2 mm thick at the protuberance 26. The distal end 22 terminates in a flange 32 of about 5 mm thick.

With regard to the fin 14, the middle layer 70 is about 7 mm to about 12 mm, preferably about 8 mm to about 10 mm, more preferably 9 mm thick on the proximal base 110 (see FIG. 4), and is about 0 mm to about 0.5 mm preferably 0 mm thick on each of the distal base 118 and the fin tip 102 (see FIG. 5).

An outer layer 82 covers the structural layer 70. It is a washable material and can be provided in a number of colours. The material is preferably a single elastomeric thermoplastic, such as, but not limited to Ethylene Vinyl Acetate (EVA). The preferred EVA product is Lunalastik™, a product used in making orthotics. It has a density of approximately. 0.23 g/mm$^3$ and a durometer rating of about 25 on the A scale. Other durometer ratings that are acceptable are about 20 to about 35 and preferably about 22 to about 30. The outer layer 82 is a uniform thickness in the range of about 0.5 to about 2 mm, preferably about 0.5 to about 1.5 mm and most preferably about 1 mm. If additional padding is required, different thicknesses can be used rather than using materials of different durometer ratings. This simplifies construction the hand grip and provides superior support, vibration damping and impact absorption, thereby reducing fatigue for the user.

When used with mobility devices, the smooth outer layer 82 is preferred, while sculpting may be preferred for bicycles. This can be in the form of ridges, dimples, waffles or any other surface contour, as would be known to one skilled in the art. In this case, the outer layer 82 is made of a rubberized or rubbery layer. The durometer ratings are about 20 to about 35 and preferably about 22 to about 30 on the A durometer scale.

The fin 14 flexes in response to force. An average person will cause the fin to deflect between about 3 mm to about 6 mm, more specifically about 4 mm to about 5 mm, with the deflection increasing distally. This damps the impact of the hand on the hand grip 10, whether as a result of striking a cane, crutch or walking stick on the ground, or as a result of a bicycle traveling over rough terrain.

Figure 3:
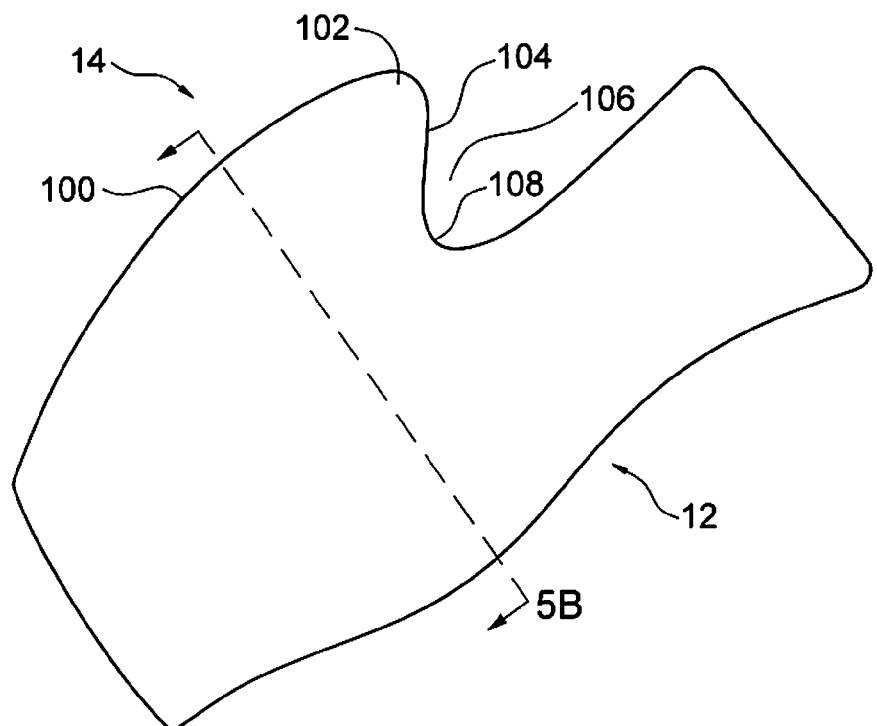
FIG. 3 is a plan view of the fin of the embodiment of FIG. 1.
Figure 4:
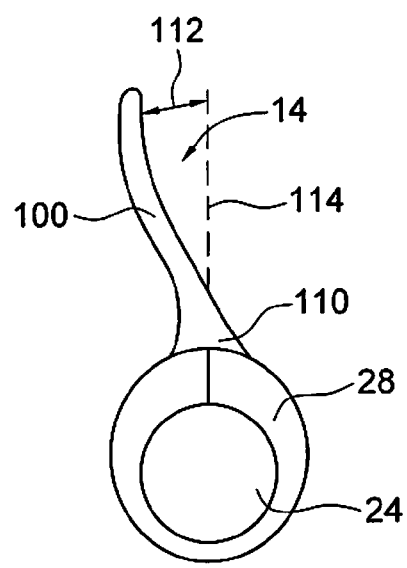
FIG. 4 is a proximal end view of the fin on the body.

Details of the fin 14 are shown in FIGS. 3, 4, and 5. As shown in FIG. 3, which is a plan view, the fin, generally referred to as 14 has a ridge 100, a tip 102, a fin return 104, and a concave region 106. The dimensions are as follows:
- the ridge 100 is about 70 mm to about 90 mm long (along the longitudinal axis 38), preferably about 75 mm to about 85 mm, most preferably 80 mm long; about 15 mm to about 35 mm high (normal to the longitudinal axis 38), preferably about 20 mm to about 30 mm, most preferably 25 mm high at the lowest point, increasing in a curvilinear manner to the tip 102;
- the tip 102 is about 35 mm to about 55 mm high (normal to the longitudinal axis 38), preferably about 40 mm to about 50 mm, most preferably about 45 mm high at the highest point; and
- the fin return 104 defines the concave region 106 between the fin 14 and the body, generally referred to as 12, the concave region being about 15 mm to about 25 mm, preferably 20 mm wide between the underside of the fin 14 and the body 12 and about 10 mm to about 15 mm deep (along the longitudinal axis). The thumb of the user sits in the concave region 106. The dimensions of the fin 14 and body 12 are such that the user is able to align the first joint of their thumb with the inner margin 108 of the concave region 106 and wrap their thumb at least partially around the body 12.

As shown in FIG. 4, which is a proximal end view, the fin, generally referred to as 14, has a ridge 100, a proximal base 110 and a lateral offset 112. Notably, the fin 14 decreases in width laterally i.e. from the proximal base 110 to the ridge 100. The dimensions are as follows:
- the ridge 100 is about 4 mm to about 6 mm, more preferably about 5 mm;

the proximal base 110 is about 7 mm to about 14 mm wide, preferably about 8 mm to about 12 mm, more preferably 10 mm wide; and the lateral offset 112 is about 15 to about 30 degrees, more preferably about 20 to about 25 degrees and most preferably at 23 degrees from a vertical axis 114. The offset mimics the angle at which the user's thumb naturally extends from the remainder of the user's hand.

Figure 5A:
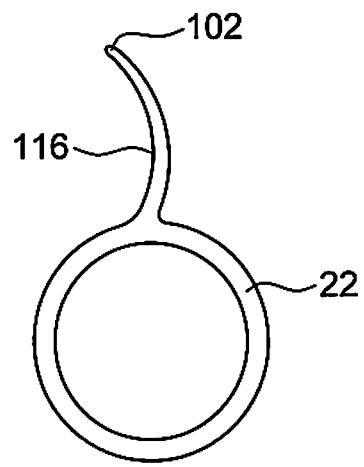
FIG. 5A is a distal end view of the fin on the body and FIG. 5B is a sectional view taken along line 5B in FIG. 3.
Figure 5B:
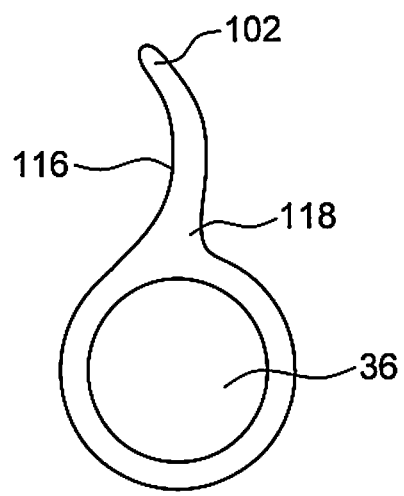

As shown in FIG. 5A, which is a distal end view, the fin 14 has a distal base 118, a fin tip 102, and a longitudinal depression 116 with each of the fin tip 102 and the inner margin 108 of the concave region 106 preferably lacking the structural layer 70. As shown in FIG. 5B, the fin 14 decreases in width from the distal base 118 to the fin return 104 and the fin tip 102. As can be seen by comparing the dimensions of the distal base 118 and the proximal base 110, the fin decreases in width from the proximal base 110 to the distal base 118. The dimensions are as follows:

the distal base 118 is about 0.5 mm to about 4 mm wide, preferably 1 mm to about 3 mm, more preferably 2 mm wide;

the fin tip 102 is about 1 mm to about 2.5 mm wide, preferably 1.5 mm to about 2 mm wide, more preferably 2 mm wide;

the fin return 104 is about 1 mm to about 2.5 mm wide, preferably 1.5 mm to about 2 mm wide, more preferably 2 mm wide; and the longitudinal depression 116 is formed to rest the user's thenar eminence and is about 10 mm deep decreasing proximally to nothing over about 30 mm.

Figure 6:
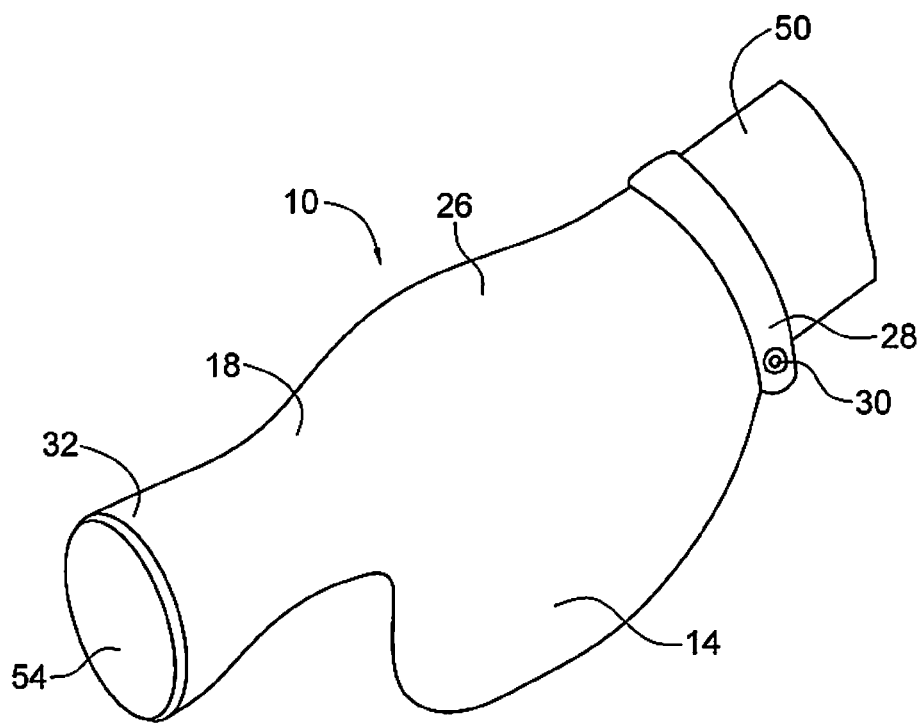
FIG. 6 is a perspective view of the embodiment of FIG. 1, mounted on a handle.

FIG. 6 shows a hand grip 10 on a tube or bar 50. This may be, for example, but not limited to a handle or a crutch hand support. The clamp 28 holds the hand grip 10 in place on the handle 50. The flange 32 extends radially outward in the vicinity of the distal end 22 to assist in hand placement. An end cap 54 is located in the distal aperture 40.

The hand grip 10 is ergonomically designed. The heel of a user's hand rests on the fin 14, while the thumb fits around the hand grip 10 at the distal region 18. The protuberance 26 fits into the palm of the hand, providing cushioned support. The fourth and fifth finger close around the hand grip 10 at the proximal region 20. As there is a gradual increase in cross sectional area in the distal 18 and proximal 20 regions, differences in hand sizes can be accommodated by shifting the hand on the hand grip 10 until a comfortable fit is found. Additionally, placement of the hand grip 10 on the tube 50 can be optimized by rotating the grip 10 and by moving it longitudinally along the tube 50. Once the hand grip 10 placement is optimized, the clamp 28 is tightened over the hand grip 10 and tube 50, immobilizing the hand grip 10.

Figure 7:
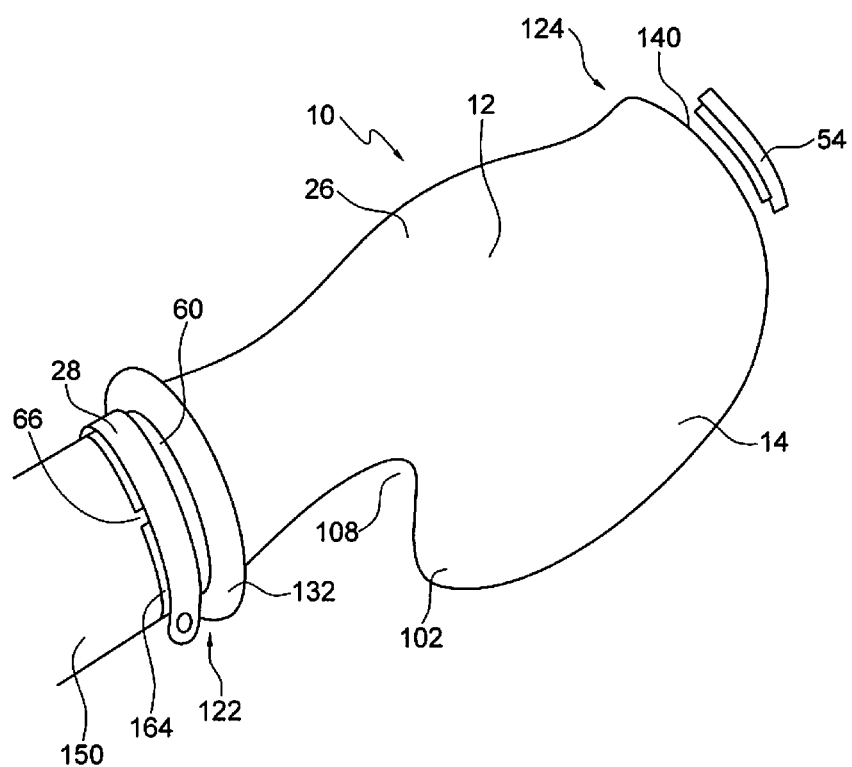
FIG. 7 is a perspective view of an alternative embodiment of the present technology, mounted on a bicycle handlebar, with the outboard end exploded.

As shown in FIG. 7, when used on a bicycle handlebar 150, the clamp 28 may be located on the inboard end, generally referred to as 122 or may be on the outboard end, generally referred to as 124. The fin tip 102 extends towards the inboard end 122. The core 60 has an inboard zone 164 that extends beyond the structural layer 70 and the outer layer 82 to allow for the clamp 28 to tighten around the core 60, just as the clamp is tightened around the proximal zone 64 of the core 60 when used on the handle 50 of an assistive mobility device. The inboard zone 164 of the core 60 has at least one slot 66 extending into the core 60. The slot allows the circumference of the core 60 to be reduced under the pressure of the clamp 28, thereby retaining the hand grip 10 in place. The clamp 28 has a fastener 30 that when tightened, compresses the clamp 28 and the core 60. The fastener 30 extends through a clamp aperture 61 and a vertically disposed retainer aperture 62 to assist in aligning the hand grip 10 and clamp 28. A flange 132 is located in the vicinity of the inboard end 122. The flange 132 extends radially outward to assist in hand placement. An end cap 54 is located in the outboard aperture 140. The outboard end 124 may be retained with a clamp 56 and fastener 58. As would be appreciated, there is a left and a right hand grip 10, each being mirror images of the other.

Figure 8:
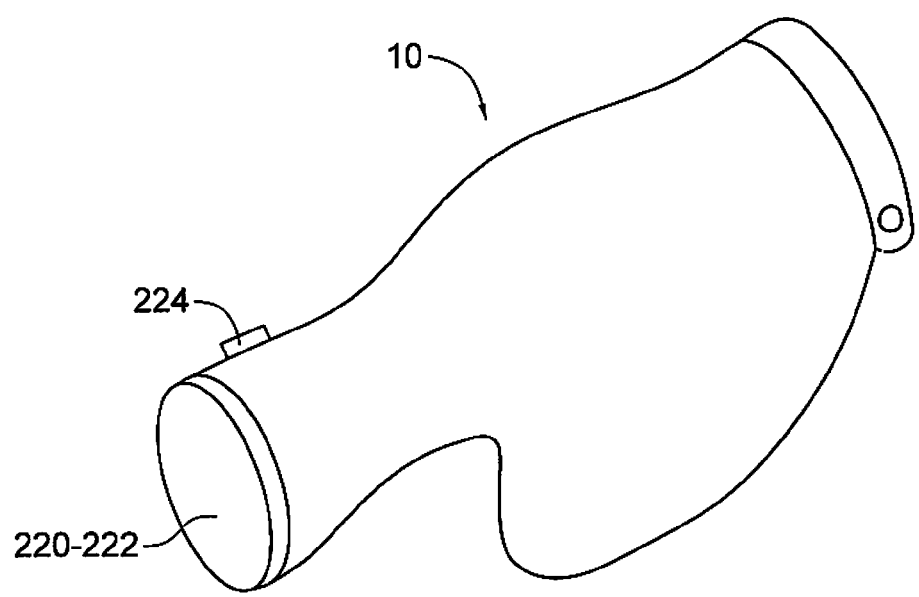
FIG. 8 is a perspective view of an alternative embodiment of the present technology.

As shown in FIG. 8, the end cap 54 can be replaced with a light 220 and power source 222. The power source may be integral with the light, or may be separate, for example, a separate battery. A switch 224 is provided for turning the light 220 on and off. The switch can be pressure activated or motion activated. It may be separate from the light, as shown, or integral to the light. The light provides a safety feature as it shines in the direction of travel if mounted on an assistive mobility device and at right angles to the direction of travel if mounted on a bicycle, allowing motorists to see a user crossing a road in front of them.

Figure 9:
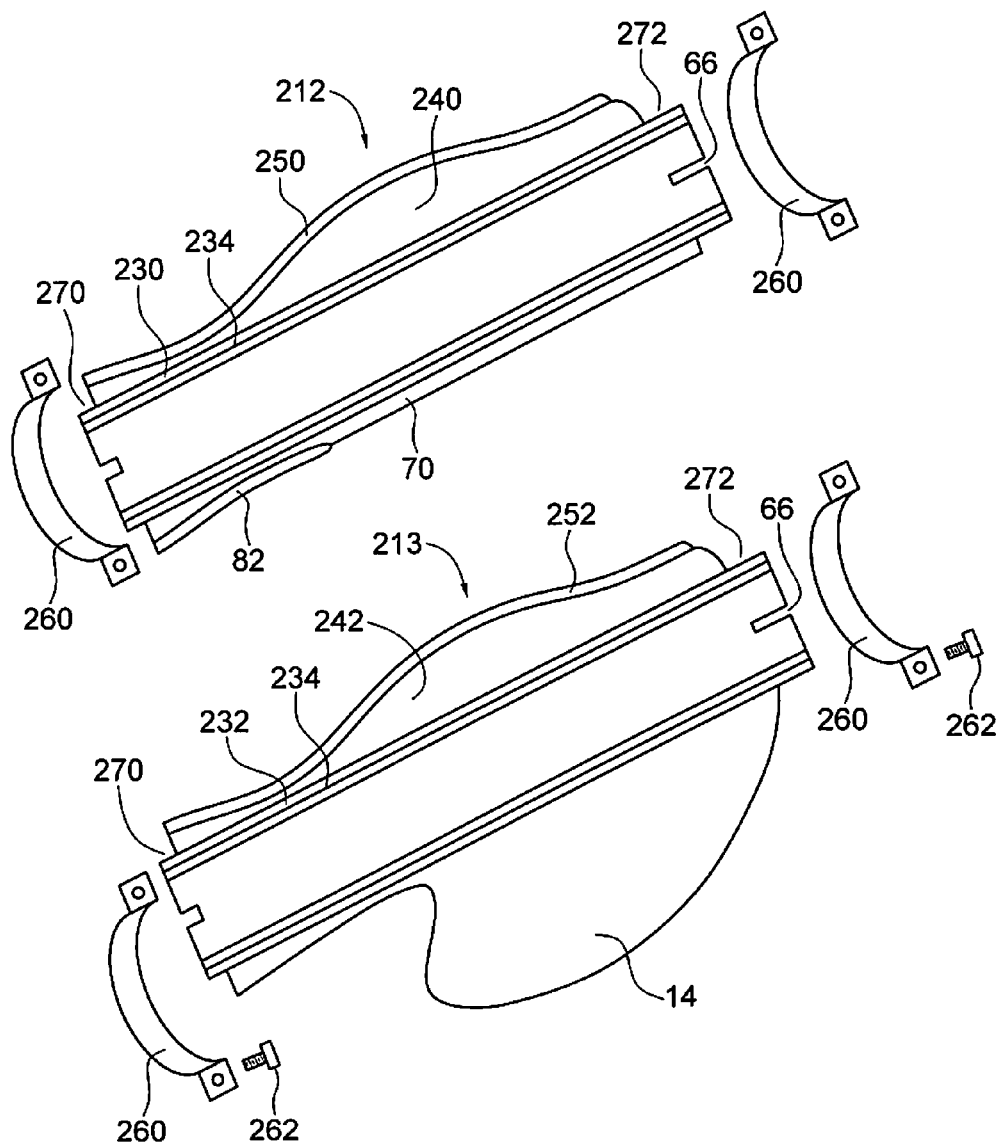
FIG. 9 is a clamshell view of an alternative embodiment of the present technology.

In an alternate embodiment, the body 12 of the hand grip 10 is split longitudinally into two sections, a body upper section 212 and a body lower section 213, as shown in FIG. 9. Each of the core 60, structural layer 70, and outer layer 82 are configured to allow the hand grip 10 to be fitted on the handlebars of road bikes, similarly to affixing aerobars. The core upper section 230 and the core lower section 232 have mating members 234. The mating members are preferably releasable and are a tongue in groove type of mating members. The structural layer upper section 240 abuts the structural layer lower section 242. Similarly, the outer layer 82, or cover has an outer layer upper section 250 that abuts an outer layer lower section 252. The fin 14 is preferably located on one of the sections and is not split. Two piece clamps 260 with fasteners 262 for tightening the clamps 260 fit over the inboard end 270 and the outboard end 272 of the core 60, which extend beyond the structural layer 70 and outer layer 82, to allow the hand grip 10 to be retained on the handlebar 50 close to the stem. As would be appreciated, there is a left and a right hand grip 10, each being mirror images of the other.

The foregoing is a description of an embodiment of the present technology. As would be known to one skilled in the art, variations that do not alter the scope of the technology are contemplated. For example, the core may be formed from the structural layer, resulting in the hand grip being two layers—the structural layer and the outer layer. This would be a preferable design if injection molding is used. The split ring clamps may be replaced with two piece clamps or other clamps that function to retain the grips. The grips may be permanently affixed to the handles or bars, using for example, but not limited to, an adhesive. The slots in the core may be replaced with a series of slits or a more malleable material may be used to construct the core. The hand grip can be used on any device or apparatus where load bearing on the hands occurs, for example, but not limited to, exercise equipment, walking sticks, and walkers.

The invention claimed is:

1. An ergonomic hand grip for use on a handle, the grip comprising a body and a fin, wherein:

the body comprises: a structural layer consisting of a single material of variable thickness, a central bore extending along a longitudinal axis for accepting the handle; an outer layer consisting of a single material of essentially consistent thickness; a proximal end; and a distal end;

the fin comprises: a structural layer consisting of a single material of variable thickness; and an outer layer consisting of a single material of essentially consistent thickness;

the fin is shaped to flexibly support a user's thenar eminence and extends from the body laterally and longitudinally, terminating in a fin tip distally and having a fin return defining, with the body, a concave region; and the structural layer is harder than the outer layer.

2. The hand grip of claim 1, wherein the fin has a lateral offset relative to a vertical axis of the hand grip.

3. The hand grip of claim 2 wherein the lateral offset is about 15 to about 30 degrees.

4. The hand grip of claim 3, further comprising a core extending along the longitudinal axis and defining the central bore.

5. The hand grip of claim 4 wherein the core has a durometer rating of at least 80 A, the structural layer has a durometer rating of about 30 A to about 50 A and the outer layer has a durometer rating of about 20 A to about 35 A.

6. The hand grip of claim 5, wherein the flexibility of the fin increases toward the fin tip.

7. The hand grip of claim 6, wherein the fin has a longitudinal depression.

8. The hand grip of claim 7, wherein the fin is integral with the body.

9. The band grip of claim 8, further comprising a clamp in a vicinity of the proximal end, for clamping the hand grip to the handle.

10. The hand grip of claim 9, wherein the core has slots and a retainer aperture in the vicinity of the proximal end.

11. An assembly for use with an assistive mobility device, the assembly comprising a handle and an ergonomic hand grip, the hand grip comprising a body, a fin, and a clamp, wherein:

the body comprises a proximal end, a distal end, and a core therebetween, the core defining a central bore along a longitudinal axis for accepting the handle, the core having slots and a retainer aperture in a vicinity of the proximal end;

both the body and fin comprise a structural layer of a single material of variable thickness, and an outer layer of a single material of essentially consistent thickness;

the core has a durometer rating of at least about 85 A, the structural layer has a durometer rating of about 30 A to about 50 A and the outer layer has a durometer rating of about 20 A to about 35 A;

the fin is shaped to flexibly support a user's thenar eminence, extends from the body laterally and longitudinally, terminates in a fin tip distally, has a lateral offset relative to a vertical axis of the hand grip of about 15 to about 30 degrees, has a lateral depression, decreases in hardness distally and is integral with the body; and the clamp adjustably retains the hand grip to the handle.

12. An ergonomic, force-absorbing hand grip for use on a bicycle handlebar, the hand grip comprising:

a body, the body comprising:

a structural layer of variable thickness; a central bore for accepting the handlebar, an outer layer of essentially consistent thickness, the structural layer being harder than the outer layer; an inboard end; an outboard end, and a centrally located Protuberance;

a fin, the fin being integral with and extending laterally from the body, terminating in a distally disposed tip, and having a fin return defining, with the body, a concave region, and comprising: the structural layer; and the outer layer, the structural layer of variable thickness and the outer layer of essentially consistent thickness; and at least one clamp, the clamp for releasably retaining the hand grip on the handlebar, wherein differences in thickness in the structural layer provide differences in force-absorption in the hand grip.

13. The band grip of claim 12 further comprising a core extending along a longitudinal axis and defining the central bore.

14. The hand grip of claim 13, wherein each of the core, the structural layer and the outer layer is composed of a single material.

15. The hand grip of claim 14, wherein the core has a durometer rating of at least about 85 A, the structural layer has a durometer rating of about 30 A to about 50 A and the outer layer has a durometer rating of about 20 A to about 35 A.

16. The hand grip of claim 15, wherein the fin is shaped to flexibly support a user's thenar eminence and has a lateral offset relative to a vertical axis of the hand grip of about 15 to about 30 degrees.

17. The band grip of claim 16, wherein the body comprises an upper section and a lower section.

18. The hand grip of claim 17, wherein the upper section and lower section comprise mating members disposed on a longitudinal margin thereof.

19. The hand grip of claim 18, wherein the fin is integral with the lower section of the body.

20. The hand grip of claim 19, comprising two clamps, the clamps being two piece clamps for fitting over the hand grip and handlebars.

* * * * *

UNITED STATES PATENT AND TRADEMARK OFFICE
CERTIFICATE OF CORRECTION

PATENT NO. : 8,776,321 B2
APPLICATION NO. : 13/652211
DATED : July 15, 2014
INVENTOR(S) : Sarah Doherty, Kerith Perreur-Lloyd and Barbara Poerschke Page 1 of 1

It is certified that error appears in the above-identified patent and that said Letters Patent is hereby corrected as shown below:

In the Claims

In claim 9 replace "band" at column 9, line 23, with "hand".

In claim 12 replace "Protuberance" at column 10, line 11, with "protuberance"; and "at least one" at column 10, line 18, with "a".

In claim 13 replace "band" at column 10, line 22, with "hand".

In claim 17 replace "band" at column 10, line 36, with "hand".

Signed and Sealed this
Twenty-fourth Day of February, 2015

Michelle K. Lee
*Deputy Director of the United States Patent and Trademark Office*